United States Patent
Kumar et al.

(10) Patent No.: US 10,108,647 B1
(45) Date of Patent: Oct. 23, 2018

(54) METHOD AND SYSTEM FOR PROVIDING INSTANT ACCESS OF BACKUP DATA

(71) Applicant: EMC Corporation, Hopkinton, MA (US)

(72) Inventors: Mv Kiran Kumar, Karnataka (IN); Shelesh Chopra, Karnataka (IN); Vladimir Mandic, San Jose, CA (US); Chikkam Satyam, Bangalore (IN); Arnab Bose, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 867 days.

(21) Appl. No.: 14/558,619

(22) Filed: Dec. 2, 2014

(51) Int. Cl.
*G06F 17/30* (2006.01)
*G06F 11/14* (2006.01)

(52) U.S. Cl.
CPC .... *G06F 17/30321* (2013.01); *G06F 11/1448* (2013.01)

(58) Field of Classification Search
CPC ......... G06F 17/30321; G06F 17/30233; G06F 17/30076; G06F 17/30094
USPC ........................................ 707/640, 674, 686
See application file for complete search history.

(56) References Cited

U.S. PATENT DOCUMENTS

| | | | | |
|---|---|---|---|---|
| 2009/0164409 A1* | 6/2009 | Mukherjee | .......... | G06F 17/3023 |
| 2014/0073323 A1* | 3/2014 | Lee | ........................ | H04W 16/14 |
| | | | | 455/435.1 |
| 2014/0074810 A1* | 3/2014 | Wang | ................ | G06F 17/30864 |
| | | | | 707/696 |

OTHER PUBLICATIONS

Scott Lowe, Block level storage vs file level storage: A comparison, Feb. 18, 2011.*

* cited by examiner

*Primary Examiner* — Thu-Nguyet Le
(74) *Attorney, Agent, or Firm* — Womble Bond Dickinson (US) LLP

(57) ABSTRACT

According to one embodiment, a restore module of a storage system receives a request from a client device over a network for restoring a data stream stored in the storage system. In response to the request, the restore module identifies a sparse disk file stored in the storage system, where the sparse disk file represents the requested data stream. The sparse disk file includes payload blocks sparsely located and intertwined with metadata of the sparse disk file. A converter executed in a memory by a processor of the storage system converts the sparse disk file into a native disk file based on the payload blocks of the sparse disk file, using a fast-copy method without having physically copying data content of the payload blocks. A block-based accessing interface is provided to the client to allow the client accessing the native disk file. Each block of content represented by the native disk is accessed based on a block identifier and an offset indicating a location of the block within the native disk file.

21 Claims, 13 Drawing Sheets

METHOD AND SYSTEM FOR PROVIDING INSTANT ACCESS OF BACKUP DATA

RELATED APPLICATIONS

This application is related to co-pending U.S. patent application Ser. No. 14/558,624, entitled "Method and System for Providing Clustered and Parallel Data Mining of Backup Data," filed Dec. 2, 2014, which is incorporated by reference herein in its entirety.

FIELD OF THE INVENTION

Embodiments of the present invention relate generally to data storage systems. More particularly, embodiments of the invention relate to restoration of data stored in a storage system.

BACKGROUND

Disaster recovery (DR) has been used in the output of system failures. Most DR processes take longer time to recover. With the advent of disk based targets, still the time to recover is significant. These processes do not meet the RTO's (recovery time objective) and RPO's (recovery point objective) of today's business needs. Although block based backup may meet the RPO with faster incremental backups through change block tracking and avoiding file system walking. It still does not reduce the time for disaster recovery as data has to be copied from the target back to the server.

Block based backup copies residing on data domain disks are created in the virtual hard disk (VHD) or VHDx format. This format allows one to attach the VHDx backup copy to the native client machine through various protocols, such as common Internet file system (CIFS) protocol or DDBoost™ protocol from EMC Data Domain®, both providing access over TCP networks. During disaster recovery, it still requires blocks to be copied from the VHDx files to the host disks, which takes a relatively longer period of time. Sometimes such a long time is unacceptable during the recovery.

In addition, backup copy represents a point in time (PIT) snapshot of the application/business data. Business data comprises of the following types: relational databases, mail, file system, and virtual machines (VMs), etc. Data analytics can also be done on backup copies if it is available in a format directly consumable by analytics software. This trend is also referred to as offline data mining, i.e. data mining performed on PIT view of the data (e.g., backups). Once the backup is done still there are technical challenges to facilitate clustered data analysis.

In the new age of data analytics the above problem may be targeted using frameworks like Hadoop™, where data is stored across multiple machines using high definition file system (HDFS). Example products of HDFS include OneFS™ from EMC Isilon™, where data is stored across multiple machines. Using HDFS as a backend multiple clusters can be configured to access the same dataset and perform data analysis in parallel or cluster. This requires additional system resources and adds additional overhead in terms of system complexity.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
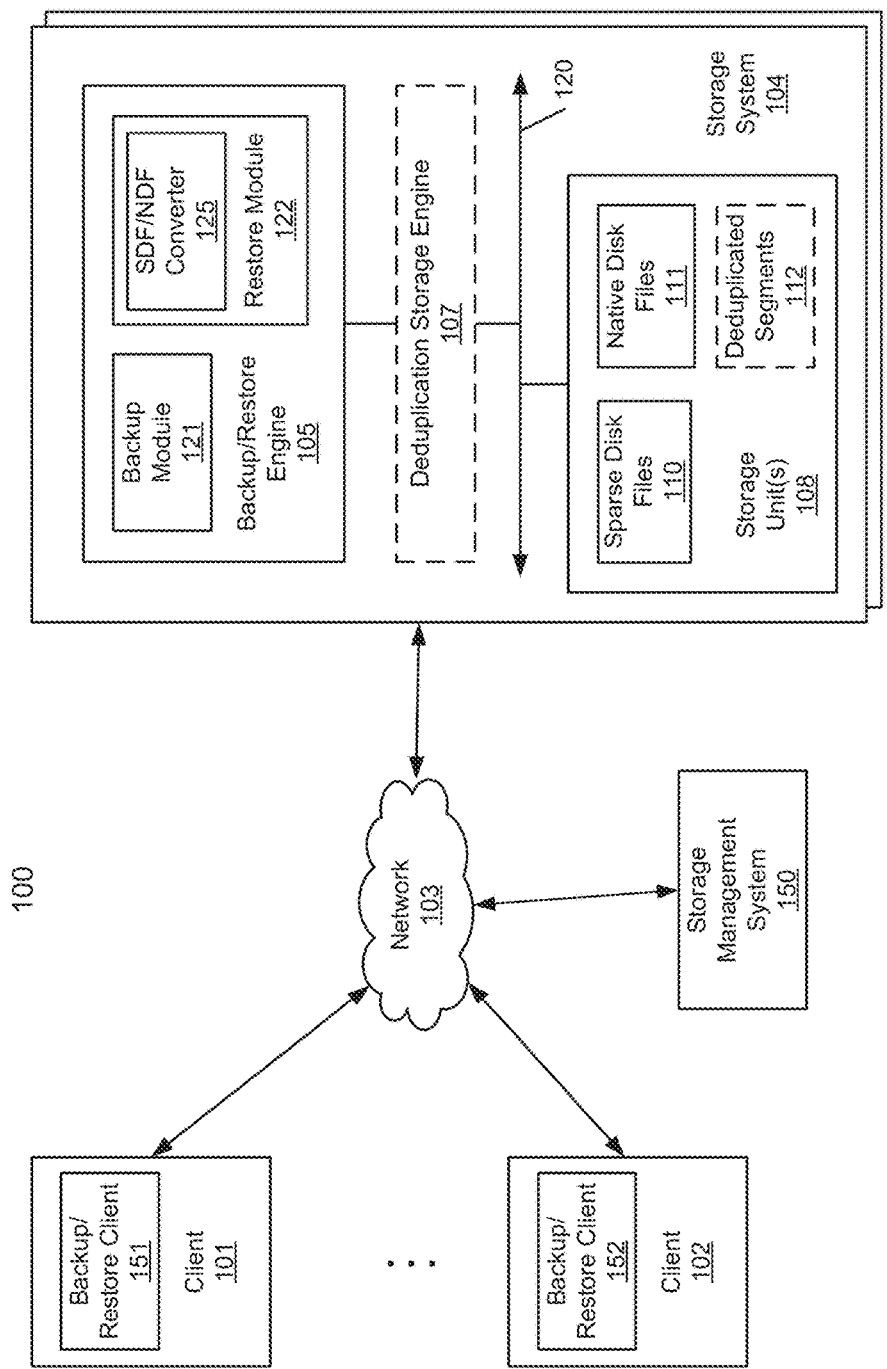
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a disk file conversion mechanism is utilized to convert certain types of disk files, such as sparse disk files, into a traditional native disk file that can be accessed via a traditional block-based access method (e.g., a small computer system interface (SCSI) and Fibre channel (FC) interface). The term of a sparse disk file refers to a disk image file having data blocks that are sparsely distributed or located within the disk image file. A native disk file refers to a traditional disk image file having data blocks that are contiguously located within the disk image file. An example of a sparse disk file includes a virtual hard disk (VHD) or Hyper-V™ VHD (VHDx) file that typically requires a specific recovery method or file system in order to restore the disk content embedded within the sparse disk file, since the payload data blocks are not contiguously located.

In one embodiment, based on the sparse disk file, a native disk file is instantly created using a fast-copy method. The term of "fast-copy" method refers to creating a target file (e.g., native disk file) by including only pointers to the payload blocks of a source file (e.g., sparse disk file), without copying the actual data blocks or content of the source file. The target file includes all the necessary information or metadata (e.g., master boot record or MBR, partition table(s), etc.) describing the actual disk image represented by the source file. The target file is then exposed to a client via a block-based access interface. When the client attempts to access the native disk file, the specific block or blocks of the content being accessed is then retrieved from the source file. Any writes to the native disk file may be maintained in a separate file (e.g., child file) related to the native disk file, without modifying the source file. As a result, a target file represents an instant copy or snapshot of the source file. Since the recovery system or the necessary storage file system associated with the source file is not utilized, the target file can be instantly available to the client.

According to another embodiment, since a native disk file can be instantly created from a sparse disk file, using the similar techniques multiple instances or copies of the native disk file can also be created from the sparse disk file. The multiple instances or copies of the native file can then be simultaneously mounted and exposed to multiple client machines via a respective block-based access interface to enable the clients to concurrently restore or analyze the data stored in the respective native disk files. As a result, multiple clients can concurrently analyze different portion of the same data set stored in the native disk files. Such analysis can be performed in a distributed manner and a final analysis result can be generated by combining the individual analysis results.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Alternatively, any of clients 101-102 may be a primary storage system that provides storage to other local clients, which may periodically back up the content stored therein to a backup storage system, such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include any type of server or cluster of servers. For example, storage system 104 may be a storage server used for any of various different purposes, such as to provide multiple users with access to shared data and/or to back up data (e.g., mission critical data). In one embodiment, storage system 104 includes, but is not limited to, backup engine 106, deduplication storage engine 107, and one or more storage units 108 communicatively coupled to each other. Storage units 108 may be implemented locally (e.g., single node operating environment) or remotely (e.g., multi-node operating environment) via interconnect 120, which may be a bus and/or a network (e.g., a storage network or a network similar to network 103). Storage units 108 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

In response to a data file to be stored in storage units 108-109, according to one embodiment, deduplication storage engine 107 is configured to segment the data file into multiple chunks (also referred to as segments) according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108 or across at least some of storage units 108. The metadata may be stored in at least some of storage units 108, such that files can be accessed independent of another storage unit. Metadata of each storage unit includes enough information to provide access to the files it contains.

In one embodiment, any of clients 101-102 may further include a backup/restore client having an optional deduplication engine (e.g., backup/restore clients 151-152) having at least a portion of functionalities of deduplication engine 107. The deduplication engines are configured to perform local deduplication operations, respectively. For example, prior to transmit data to storage system 104, each of the deduplication engines may deduplicate the data into deduplicated segments and determine whether a particular deduplicated segment has been stored in storage system 104. A deduplicated segment is transmitted to storage system 104 only it has not been stored in storage system 104.

For example, when client 101 is about to transmit a data stream (e.g., a file or a directory of one or more files) to storage system 104, the deduplication engine is configured to deduplicate the data stream into deduplicated segments. For each of the deduplicated segments, client 101 transmits a fingerprint of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic and the processing resources required can be greatly reduced.

Although one storage system is shown, however, storage system 104 may represent multiple storage systems, which may be managed by management server 150. In one embodiment, nanagement server 150 is to manage operations of storage systems 104-105, as well as clients 101-102. For example, management server 150 may be an EMC Networker™ server. An administrator can log into management server from a client device such as a management console via an administrative interface (e.g., Web interface or command line interface or CLI). An administrator can utilize a backup manager or backup engine (not shown) to configure and initiate a backup or replication from any of clients 101-102 to any of storage systems 104. From management server 150, an administrator can also provision or allocate any one or more of storage systems 104 to provide storage services to clients 101-102. For example, storage systems 104 may be members of storage servers in a cloud, which may be public cloud, private cloud, or a hybrid cloud. Storage servers 104 may be configured to provide storage as a service or software defined storage services, for example, as part of a software defined data center.

In one embodiment, storage system 104 includes a backup/restore engine or software 105 responsible for backing up and/or restoring data stored in storage system 104. Backup/restore engine 105 includes backup module (or backup unit or backup logic) 121 and restore module (or restore unit or restore logic) 122. Backup module 121 is configured or adapted to receive backup data streams from clients 101-102 and store the backup data streams in storage unit(s) 108, with optional deduplication. Backup module 121 may receive a backup request from any of the clients 101-102 to initiate a backup operation. Alternatively, backup module 121 may receive a backup instruction from management server 150 to back up data from any of clients 101-102 to storage system 104. Similarly, restore module 122 is configured or adapted to restore the backup data stored in storage system 104 to any of clients 101-102, in response to a request from clients 101-102 and/or management server 150.

In one embodiment, the backup data streams are stored in storage device 108 of storage system 104 in a form of sparse disk files 110. Sparse disk files 110 may further be deduplicated by deduplication engine 107 and stored as part of deduplicated segments 112, as well as metadata (e.g., fingerprints) associated with deduplicated segments 112 (not shown). A sparse disk file refers to a disk image file having data blocks that are sparsely distributed or located within the disk image file, where each of the data blocks (also referred to as payload blocks) is referenced by an entry of a block allocation table (BAT) within the disk image file. An example of a sparse disk file includes VHD or VHDx file that typically requires a specific recovery method or file system in order to restore the disk content embedded within the sparse disk file, since the payload data blocks are not contiguously located.

In one embodiment, restore module 122 is configured or adapted to restore the data stored in storage system 104, such as, for example, sparse disk files 110 to clients 101-102. Such a restoration operation typically requires the specific file system and other recovery mechanism or software, which takes relatively long time to have the recovered data available to clients 101-102. In one embodiment, restore module 122 further includes a sparse disk file (SDF) to native disk file (NDF) converter (or converting logic) 125 to convert sparse disk files 110 into native disk files 111. A native disk file refers to a traditional disk image file having data blocks that are contiguously located within the disk image file, which can be accessed based on an offset and/or a block size. Native disk files 111 can then be mounted and exposed to clients 101-102 instantly via a block-based access interface or protocol (not shown), such as, for example, SCSI or Fibre channel interface. As a result, clients 101-102 can instantly access disk content stored within sparse disk files 110 without having to go through the complex access methods in order to access sparse disk files 110.

In one embodiment, based on the sparse disk file, a native disk file is instantly created using a fast-copy method performed by a fast-copy and rebase module (or unit or logic, not shown). The term of "fast-copy" method refers to creating a target file (e.g., native disk file) by including only pointers or metadata referencing the payload blocks of a source file (e.g., sparse disk file), without copying the actual data blocks or content of the source file. In this example, a native disk file includes all the necessary information or metadata (e.g., master boot record or MBR, partition table(s), etc.) describing the actual disk image represented by a corresponding sparse disk file. The native disk file is then mounted and exposed to a client via a block-based access interface (e.g., SCSI or FC). When the client attempts to access the native disk file, the specific block or blocks of the content being accessed is then retrieved from the sparse disk file. Any writes to the native disk file may be maintained in a separate file (e.g., child file, not shown) related to the native disk file, without modifying the sparse file. As a result, a native disk file represents an instant copy or snapshot of the sparse disk file. Since the recovery system or the necessary storage file system associated with the sparse disk file is not utilized and the content or data being recovered is not physically copied or moved, the target file can be instantly available to the client.

According to another embodiment, since a native disk file can be instantly created from a sparse disk file, using the similar techniques multiple instances or copies of the native disk file can also be created from the sparse disk file as a source. The multiple instances or copies of the native file can then be simultaneously mounted and exposed to multiple client machines via a respective block-based access interface to enable the clients to concurrently restore or analyze the data stored in the respective native disk files. As a result, multiple clients can concurrently analyze different portion of the same data set stored in the native disk files. Such analysis can be performed in a distributed manner and a final analysis result can be generated by combining the individual analysis results.

Figure 2:
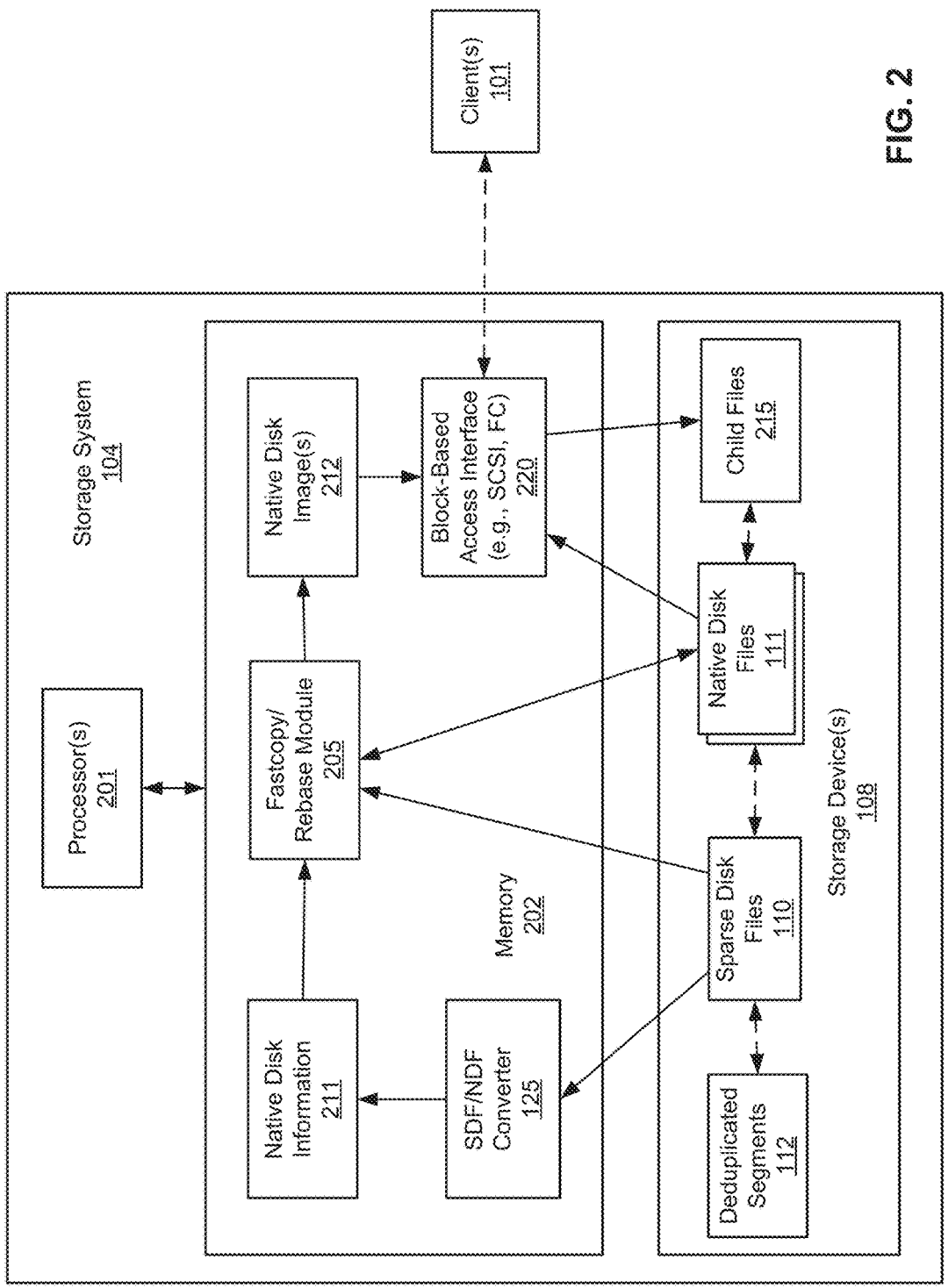
FIG. 2 is a block diagram illustrating an example of a storage system according to another embodiment of the invention.

FIG. 2 is a block diagram illustrating an example of a storage system according to another embodiment of the invention. Referring to FIG. 2, storage system 104 includes SDF/NDF converter 125, in this example, implemented as a software component executed by processor 201 in memory 202. Processor 201 may be a general-purpose processor (e.g., central processing unit or CPU) or a dedicated processing unit (e.g., ASIC or FPGA). Memory 202 may be system memory of storage system 104 or dedicated memory. In one embodiment, in response to a request for restoring data stored in storage system 104, SDF/NDF converter 125 is configured to identify a sparse disk file from sparse disk files 110 based on the request.

SDF/NDF converter 125 parses sparse disk file 110 to obtain metadata of a corresponding native disk information, such as, for example, the MBR and other partition tables, etc. From the metadata, SDF/NDF converter 125 can determine a configuration or disk layout of the native disk, such as, for example, a disk size and/or block size of the native disk to generate native disk information 211. In one embodiment, SDF/NDF converter 125 walks through entries of a block allocation table of sparse disk file 110 to identify the related payload blocks in which the metadata of the native disk image is stored and to obtain the metadata of the native disk image. Based on native disk information 211, fast-copy and rebase module 205 is to construct a native disk file having a layout described by native disk information 211, without physically copying or moving the actual data content associated with sparse disk file 110, to generate native disk image 212. That is, instead of containing the actual data content of sparse disk file 110, native disk image 212 only contains metadata, such as, for example, pointers referencing the payload blocks of sparse disk file 110. As a result, native disk image 212 can be created instantly. Native disk image 212 is then stored in storage device 108 as part of native disk files 111.

Native disk image 212 can instantly mounted and exposed to external client 101 via a block-based access interface 220 such as SCSI or FC interface. For example, native disk image 212 can be mounted as a SCSI drive accessible over a network. Native disk image 212 can be accessed in a read/write mode, without having to jeopardize the original data content of sparse disk file 110. When client 101 reads a particular block or blocks from native disk image 212, a file manager or block-based disk driver (not shown) can identify the corresponding block or blocks from sparse disk file 110 based on the metadata (e.g., pointers) of native disk file 111 to retrieve the data block or blocks and to return the blocks back to client 101. When client 101 writes or modifies a particular data block, the new or modified block is stored in a separate file as part of child files 215 referenced by native disk files 111, without altering the source, sparse disk files 110. A child file only contains the difference between a newer version and a previous version of native disk file 111, similar to an incremental backup with respect to a full backup represented by native disk file 111.

In one embodiment, sparse disk files 110 may be deduplicated, for example, by deduplication engine 107 of FIG. 1, into deduplicated segments 112. In such scenario, instead of containing the actual data segments, sparse disk files 110 contain references to deduplicated segments 112 that are associated with the sparse disk files. For example, sparse disk files 110 may contain fingerprints of deduplicated segments 112. When data blocks of sparse disk files 110 are accessed, for example, from native disk files 111, the fingerprints of the data blocks are obtained from sparse disk files 110 and the associated deduplicated segments are accessed based on the fingerprints via the deduplication engine. Deduplicated segments 112 may be stored in one or more compression regions and one or more compression regions may be stored in one or more storage containers in storage device 108. Alternatively, when native disk files are created, native disk files may directly contain fingerprints of the associated deduplicated segments 112.

Figure 3:
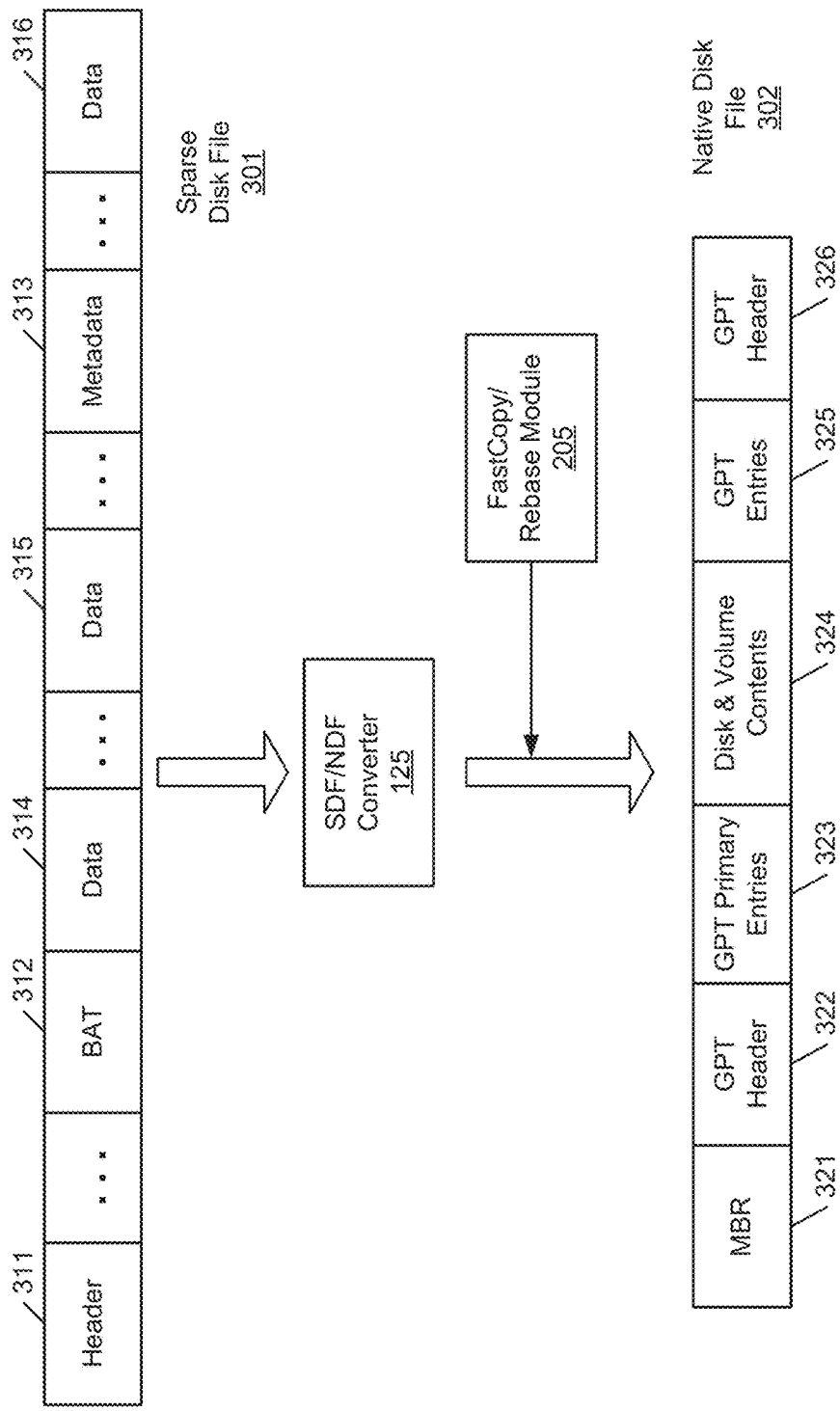
FIG. 3 is a block diagram illustrating a conversion process from a sparse disk file to a native disk file according to one embodiment of the invention.

FIG. 3 is a block diagram illustrating a conversion process from a sparse disk file to a native disk file according to one embodiment of the invention. Referring to FIG. 3, in this example, sparse disk file 301 includes, among others, header 311, block allocation table 312, data blocks 314-316 sparsely (e.g., non-contiguously or not in sequence) located and intertwined with other data such as metadata 313. Block allocation table 312 includes information identifying or describing data blocks 314-316, also referred to as payload blocks. In one embodiment, SDF/NDF converter 125 parses information of sparse disk file to obtain disk configuration information of native disk file 302, such as, for example, MBR 321, GUID (globally unique identifier) partition table (GPT) headers 322 and 326, GPT primary entries 323, GPT secondary entries 325, etc. GPT is a standard for the layout of the partition table on a physical hard disk using GUID. In addition, SDF/NDF converter 125 constructs disk and volume content portion 324 having pointers referencing the payload blocks (e.g., data blocks 314-316) of sparse disk file 301.

Figure 4:
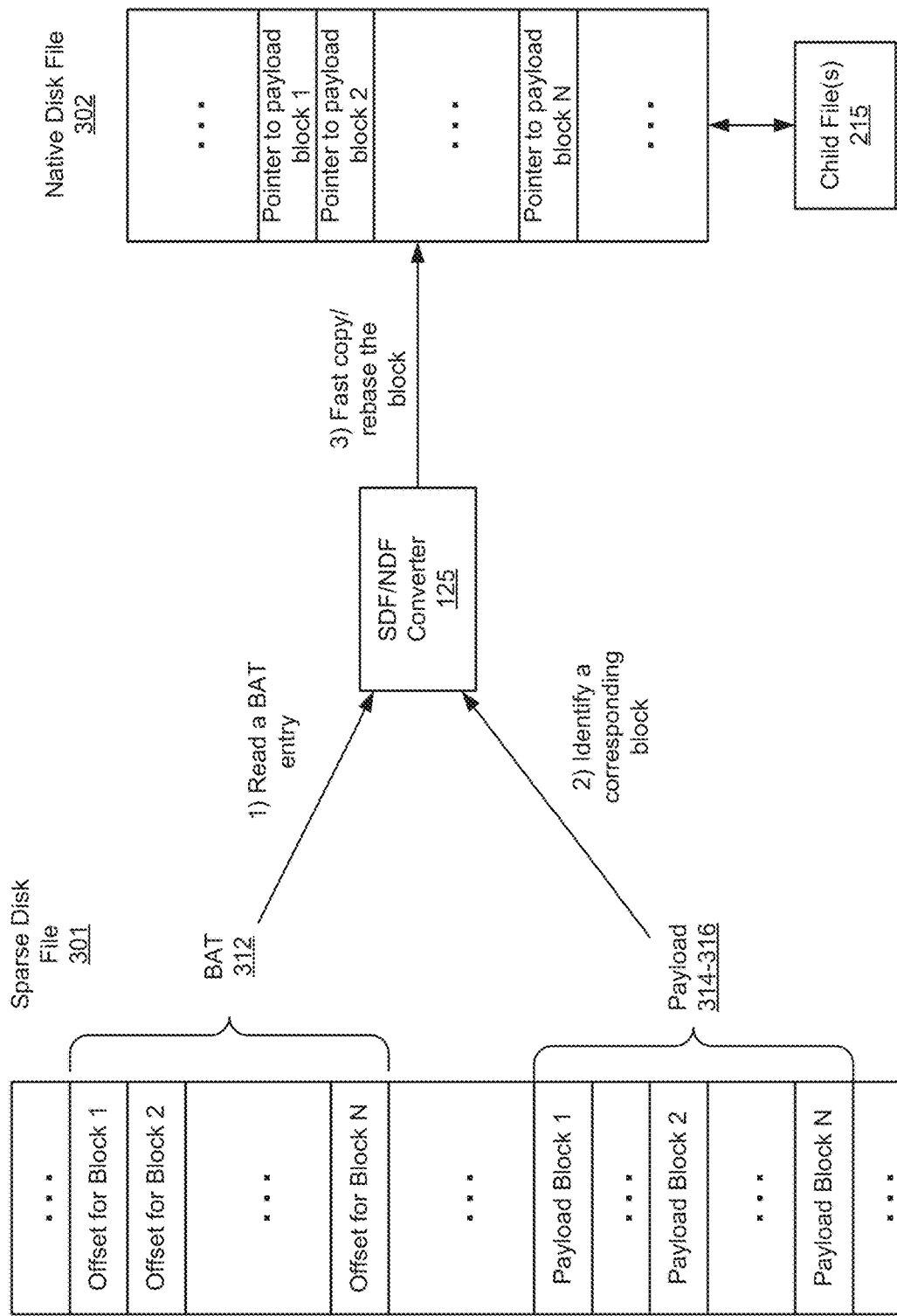
FIG. 4 is a block diagram illustrating a process of converting a sparse disk file to a native disk file according to one embodiment of the invention.

In one embodiment, as shown in FIG. 4, SDF/NDF converter 125 parses block allocation table or BAT 312 to identify and access payload blocks 314-316. In one embodiment, BAT 312 includes multiple entries, each entry having stored therein an offset or pointer identifying a corresponding payload block of payload blocks 314-316. BAT 312 is a region listed in the region table and consists of a single contiguous array of entries specifying the state and the physical file offset for each block. In one embodiment, each of the payload blocks 314-316 is a fixed size block and an entry of BAT 312 only needs to store an offset referencing the corresponding payload block. Alternatively, payload blocks may be variable sized blocks in which each entry of BAT 312 may further contain the size of the corresponding payload block. Based on the payload blocks 314-316, SDF/NDF converter 125 can determine the metadata or layout of the native disk file, including the size of the native disk file, MBR, and partition tables, etc. SDF/NDF converter 125 further creates native disk file 302 having pointers referencing the data payloads of sparse disk file 301. In one embodiment, if an entry of BAT 312 contains a zero offset or a predetermined offset (e.g., out-of-range number), SDF/NDF converter 125 may create a block in native disk file and pad it with predetermined data such as zero, such that native disk file 302 would have the size of a native disk that is specified and represented by sparse disk file 301.

In one embodiment, sparse disk file 301 is a VHD or VHDx file. Further detailed information of a VHD/VHDx file can be found in the VHDX specification version 1.00, entitled "VHDX Format Specification" published Aug. 25, 2012 by Microsoft® Corporation, which is incorporated by reference herein. However, the techniques described throughout this application can also be applied to other types of disk file having data blocks sparsely located.

Figure 5:
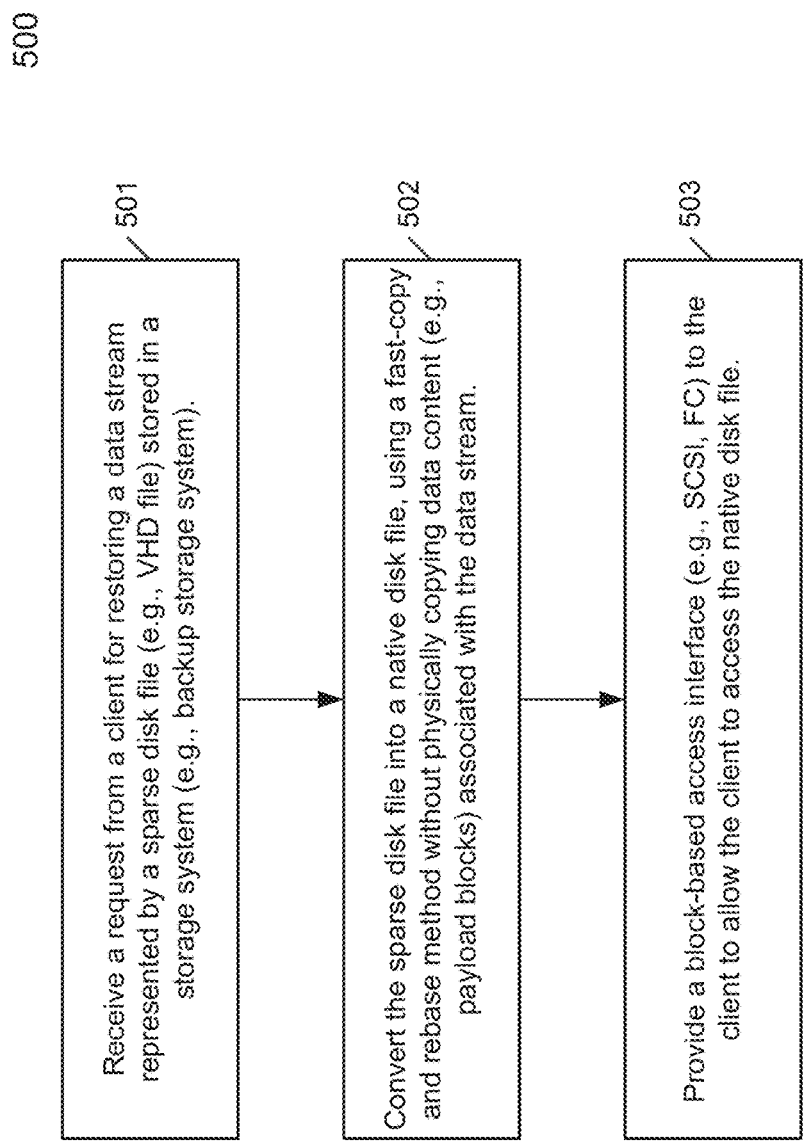
FIG. 5 is a flow diagram illustrating a process of providing instant access of data of a sparse disk file according to one embodiment of the invention.

FIG. 5 is a flow diagram illustrating a process of providing instant access of data of a sparse disk file according to one embodiment of the invention. Process 500 may be performed by processing logic which may include software, hardware, or a combination thereof. For example, process 500 may be performed by storage system 104 of FIG. 1. Referring to FIG. 5, at block 501, processing logic receives a request from a client for restoring a data stream represented by a sparse disk file (e.g., VHD/VHDx file) stored in a storage system. At block 502, processing logic converts the sparse disk file into a native disk file, using a fast-copy and rebase method without physically copying or moving data content of the sparse disk file. At block 503, a block-based access interface (e.g., SCSI or FC) is provided to allow the client to access the native disk file.

Figure 6:
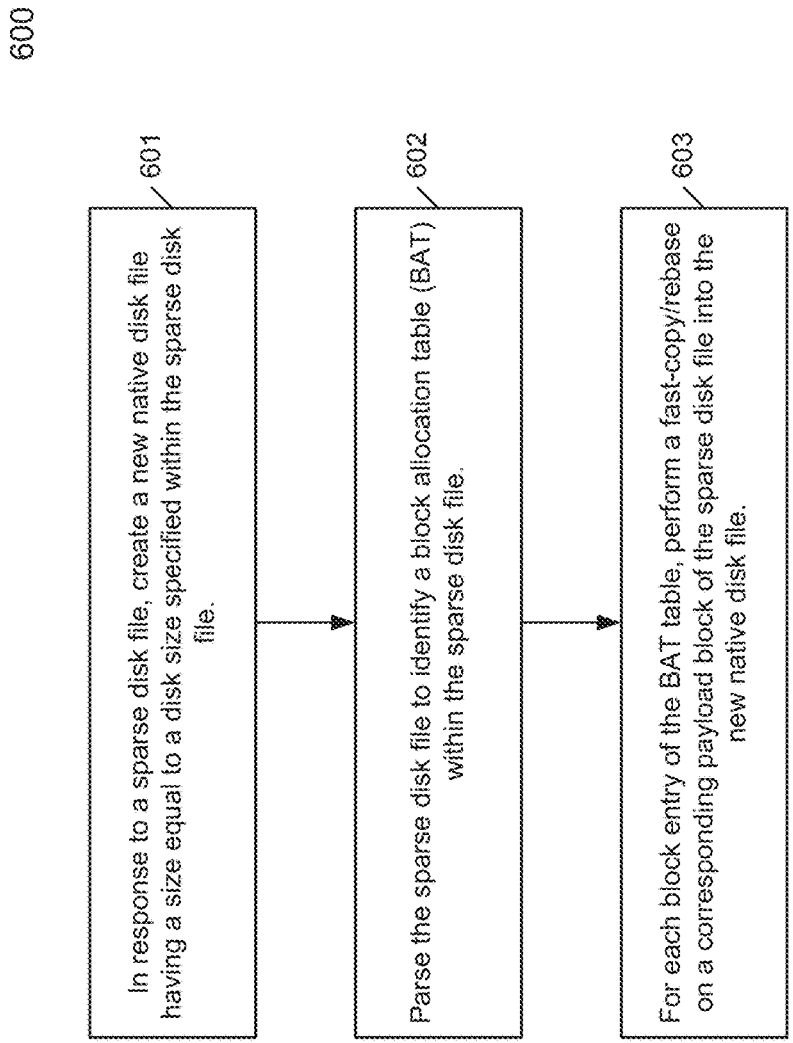
FIG. 6 is a flow diagram illustrating a process of providing instant access of data of a sparse disk file according to another embodiment of the invention.

FIG. 6 is a flow diagram illustrating a process of providing instant access of data of a sparse disk file according to another embodiment of the invention. Process 600 may be performed by processing logic which may include software, hardware, or a combination thereof. For example, process 600 may be performed as part of operations involved in block 502 of FIG. 5. Referring to FIG. 6, at block 601, in response to a sparse disk file (e.g., VHD or VHDx file), processing logic creates a new native disk file as a place holder having a size equal to the disk size specified by the sparse disk file, for example, by parsing or scanning payload blocks of the sparse disk file. At block 602, processing logic parses the sparse disk file to identify or locate a block allocation table within the sparse disk file. As described above, the block allocation table includes multiple entries, each entry storing therein an offset or location within the sparse disk file at which the payload block is located. For each of the entries, at block 603, processing logic performs a fast-copy and rebase operation on a corresponding payload block of the sparse disk file into the native disk file. In one embodiment, a disk block is created within the native disk file having a pointer or metadata referencing the corresponding payload block of the sparse disk file, without physically copying the actual content of the payload block of the sparse disk file.

Figure 7:
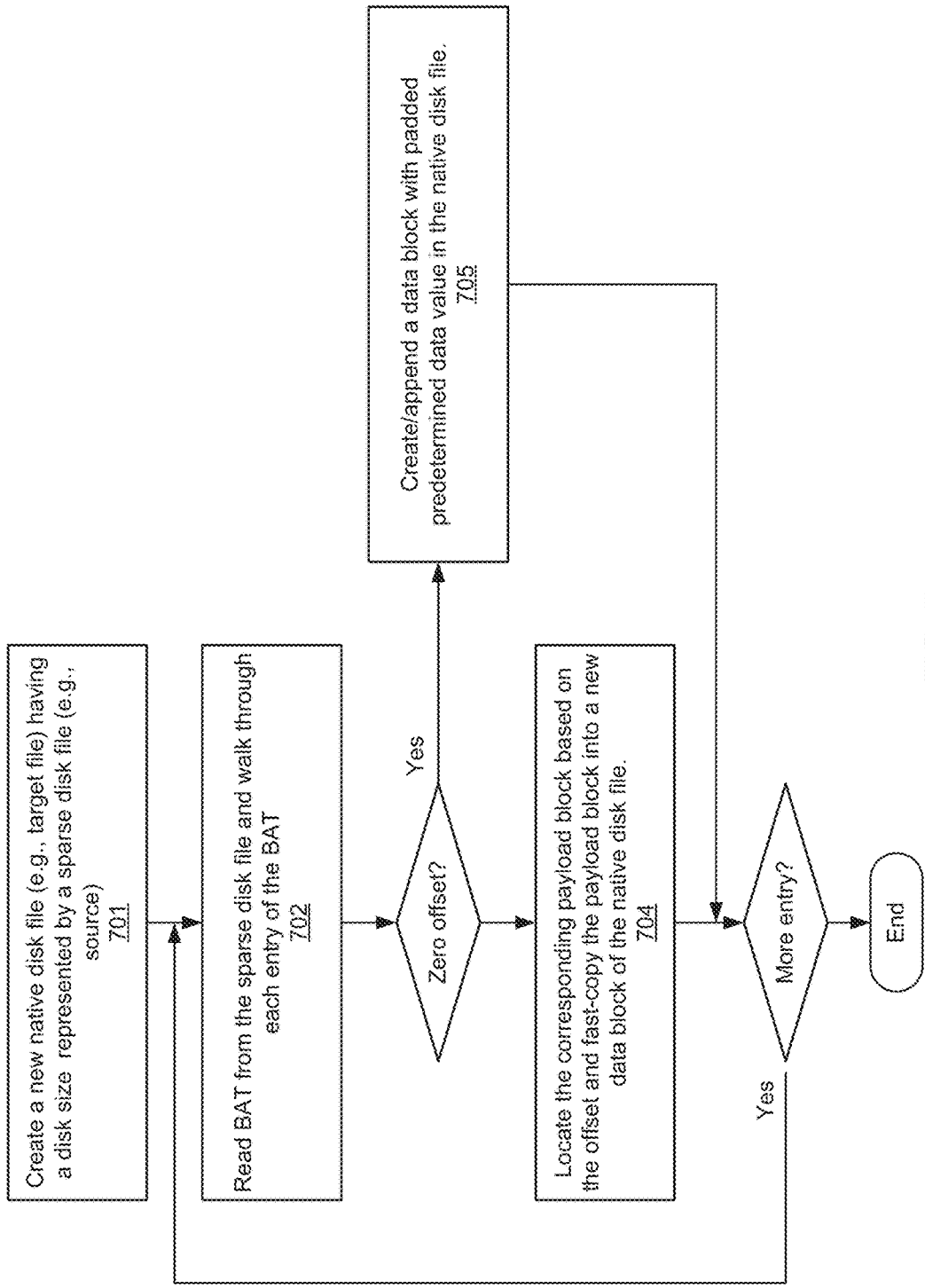
FIG. 7 is a flow diagram illustrating a process of providing instant access of data of a sparse disk file according to another embodiment of the invention.

FIG. 7 is a flow diagram illustrating a process of providing instant access of data of a sparse disk file according to another embodiment of the invention. Process 700 may be performed by processing logic which may include software, hardware, or a combination thereof. For example, process 700 may be performed as part of operations involved in block 502 of FIG. 5. Referring to FIG. 7, at block 701, in response to a sparse disk file, processing logic creates a new native disk file having a disk size equal to the disk size specified or represented by the sparse disk file. At block 702, processing logic reads the block allocation table from the sparse disk file and walks through entries of the block allocation table. For each entry of the block allocation entries, at block 703, it is determined whether the entry contains a valid offset within the sparse disk file (e.g., a number within a predetermined range or size of the sparse disk file, in this example, a non-zero value). If so, at block 704, processing logic locates the corresponding payload block within the sparse disk file based on the offset and performs a fast-copy and rebase operation from the payload block to a new data block of the native disk file. If the entry contains a zero or a predetermined number, at block 705, processing logic creates or appends a new data block with a padded predetermined value such as zero. At block 706, if there are more entries in the block allocation table, the above operations are iteratively performed until all entries of the block allocation table have been processed.

Since a native disk file is created from a sparse disk file without having to physically copy content data of the sparse disk file, the native disk file literately represents a virtual copy of the sparse disk file, but in a form of a native disk format or a virtual native disk. Such a virtual native disk can be mounted as a block-based disk accessible via a block-based access interface or protocol, such as SCSI or FC interface. As a result, such a virtual native disk file can be created instantly or very quickly. According to one embodiment, multiple native disk files (e.g., virtual native disks) can be created from the same sparse disk file representing copies of the sparse disk file. Such multiple copies of native disk files can be simultaneously mounted and accessed by multiple clients concurrently via a respective block-based access interface.

Figure 8:
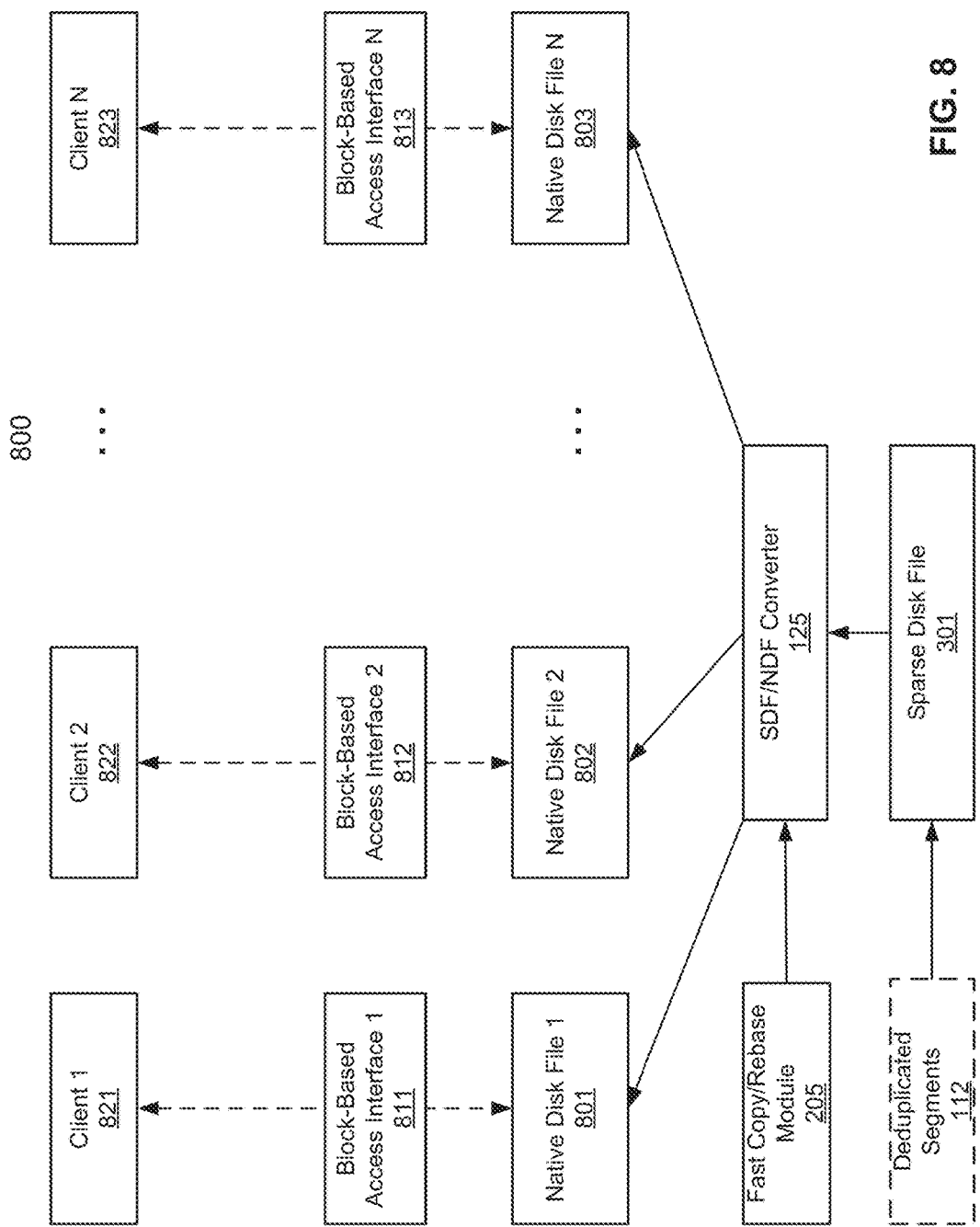
FIG. 8 is a block diagram illustrating an example of a storage system in which multiple native disk files are created from a single sparse disk file for simultaneous access according to one embodiment of the invention.

FIG. 8 is a block diagram illustrating an example of a storage system in which multiple native disk files are created from a single sparse disk file for simultaneous access according to one embodiment of the invention. Referring to FIG. 8, system 800 includes multiple native disk files 801-803 created by SDF/NDF converter 125 based on sparse disk file 301 using the techniques described above, such as fast-copy operations performed by fast-copy and rebase module 205. Native disk files 801-803 can be concurrently mounted and accessed by multiple clients 821-823 via block-based access interfaces 811-813 (e.g., SCSI, FC), respectively. System 800 may be utilized for load balancing of a content distribution system. Alternatively, system 800 may be utilized for data analytics purposes, where different portions or sections of the same data set can be concurrently analyzed by multiple analytics machines.

Figure 9A:
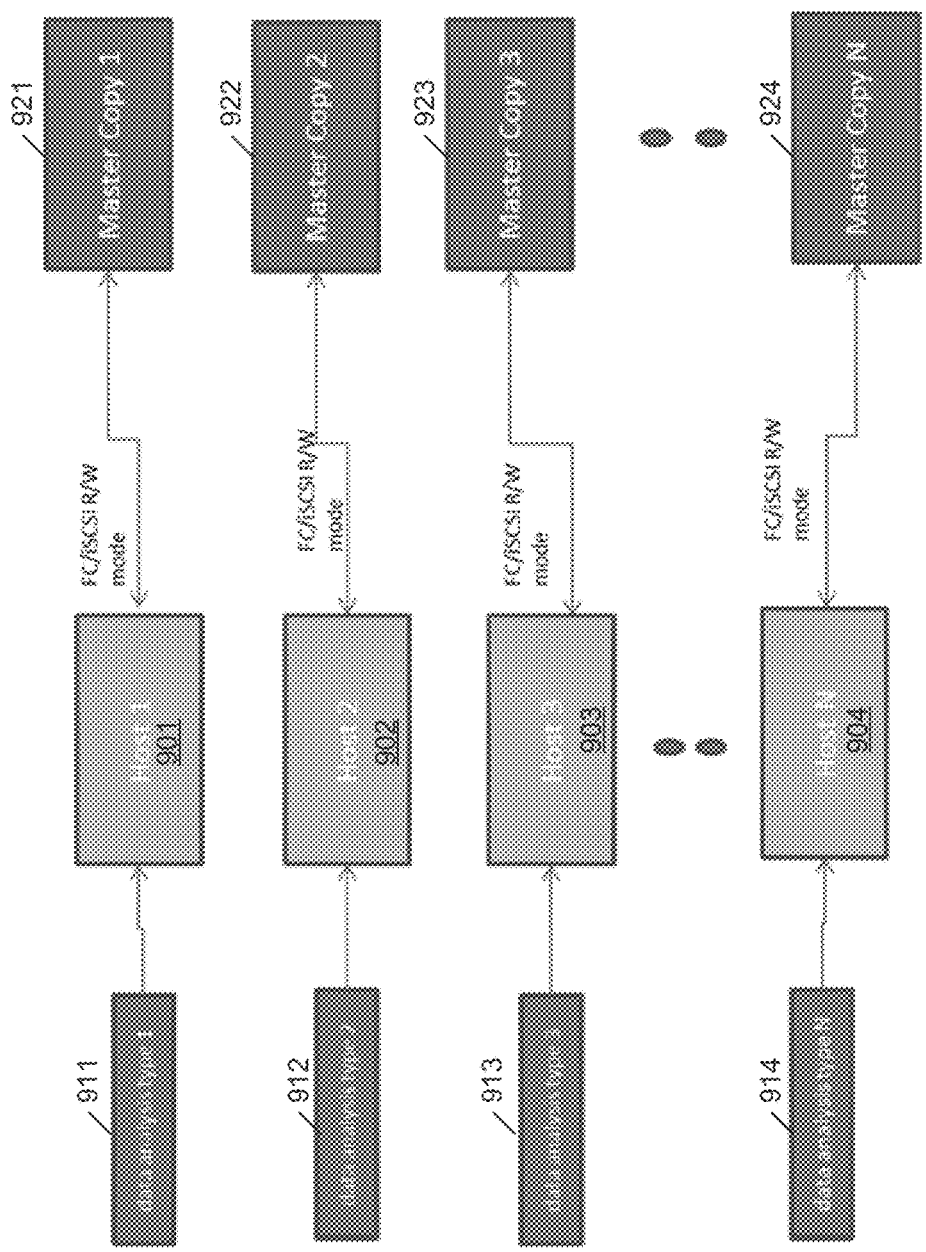
FIGS. 9A and 9B are block diagrams illustrating a distributed system according to some embodiments of the invention.
Figure 9B:
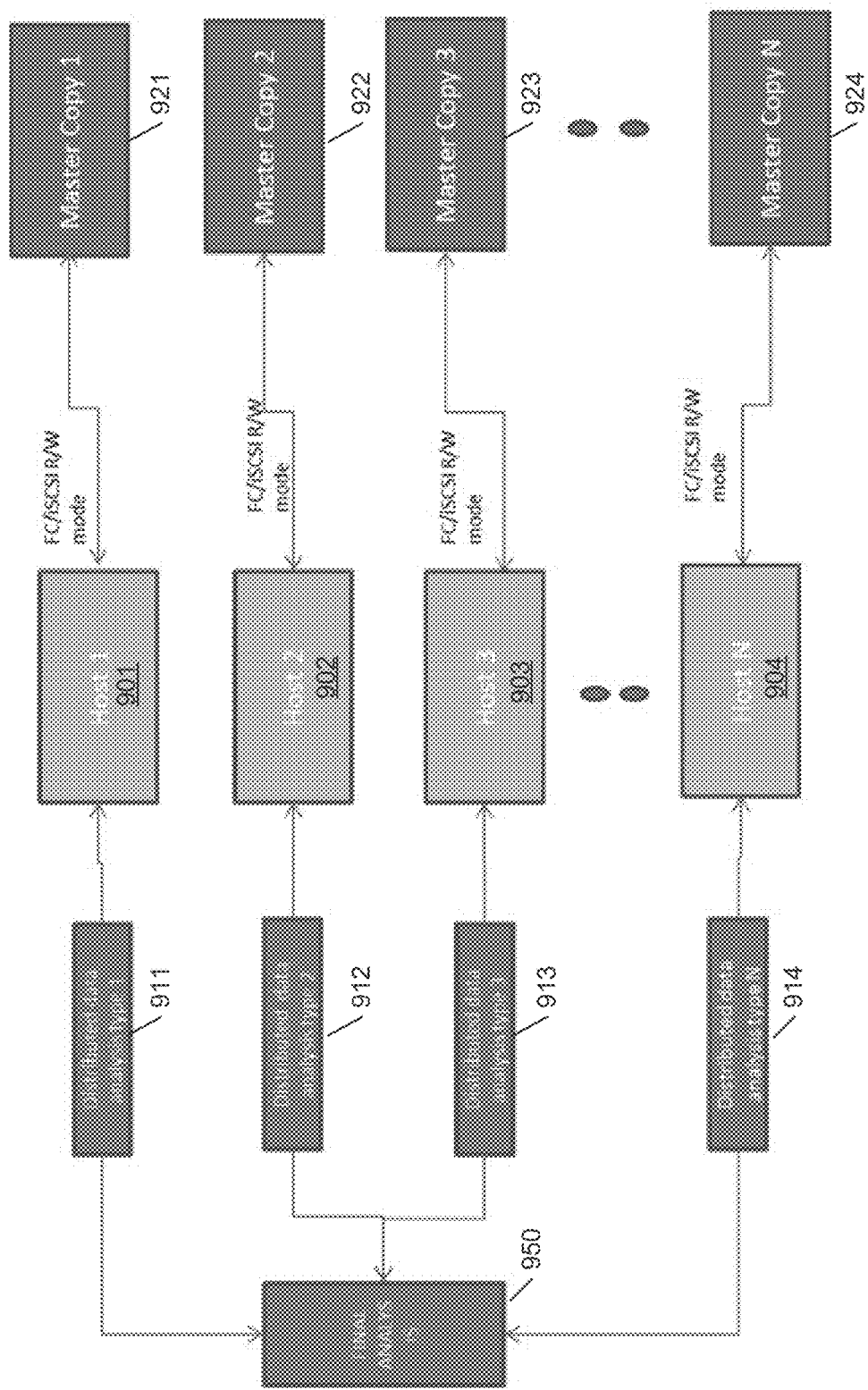

For example, as shown in FIG. 9A, multiple copies of native disk images 921-924 can be created from the same sparse disk file using the techniques described above. Multiple native disk files 921-924 can be concurrently accessed by multiple hosts 901-904 via respective block-based access interfaces in a read and write mode and in a distributed manner. Each of the hosts 901-904 may perform a different type of analysis or specifications 911-914, which may specify different types or different sections of the same data set represented by the original sparse disk file. The individual distributed analysis results can then be combined to generate a final analysis result 950 as shown in FIG. 9B.

Figure 10:
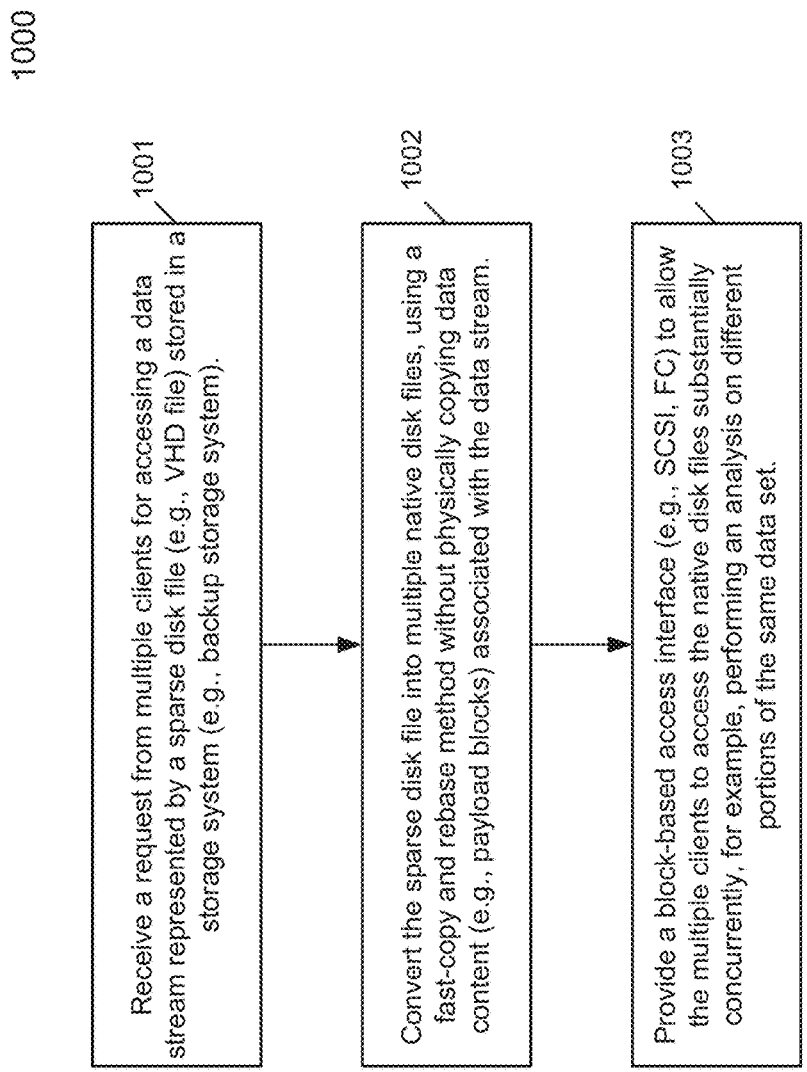
FIG. 10 is a flow diagram illustrating a process of creating multiple native disk files from a single sparse disk file for simultaneous access according to one embodiment of the invention.

FIG. 10 is a flow diagram illustrating a process for providing concurrent access to data of a sparse disk file according to one embodiment of the invention. Process 1000 may be performed by processing logic which includes software, hardware, or a combination hereof. For example, process 1000 may be performed by system 800 of FIG. 8. Referring to FIG. 10, at block 1001, processing logic receives a request for performing data analysis on a data stream represented by a sparse disk file (e.g., VHD or VHDx file) stored in a storage system. At block 1002, processing logic converts the sparse disk file into multiple native disk files using a fast-copy method without physically copying actual data content of the sparse disk file. At block 1003, a block-based access interface is provided to allow multiple clients to concurrently access the native disk files, for example, for analyzing the data of the native disk files.

Figure 11:
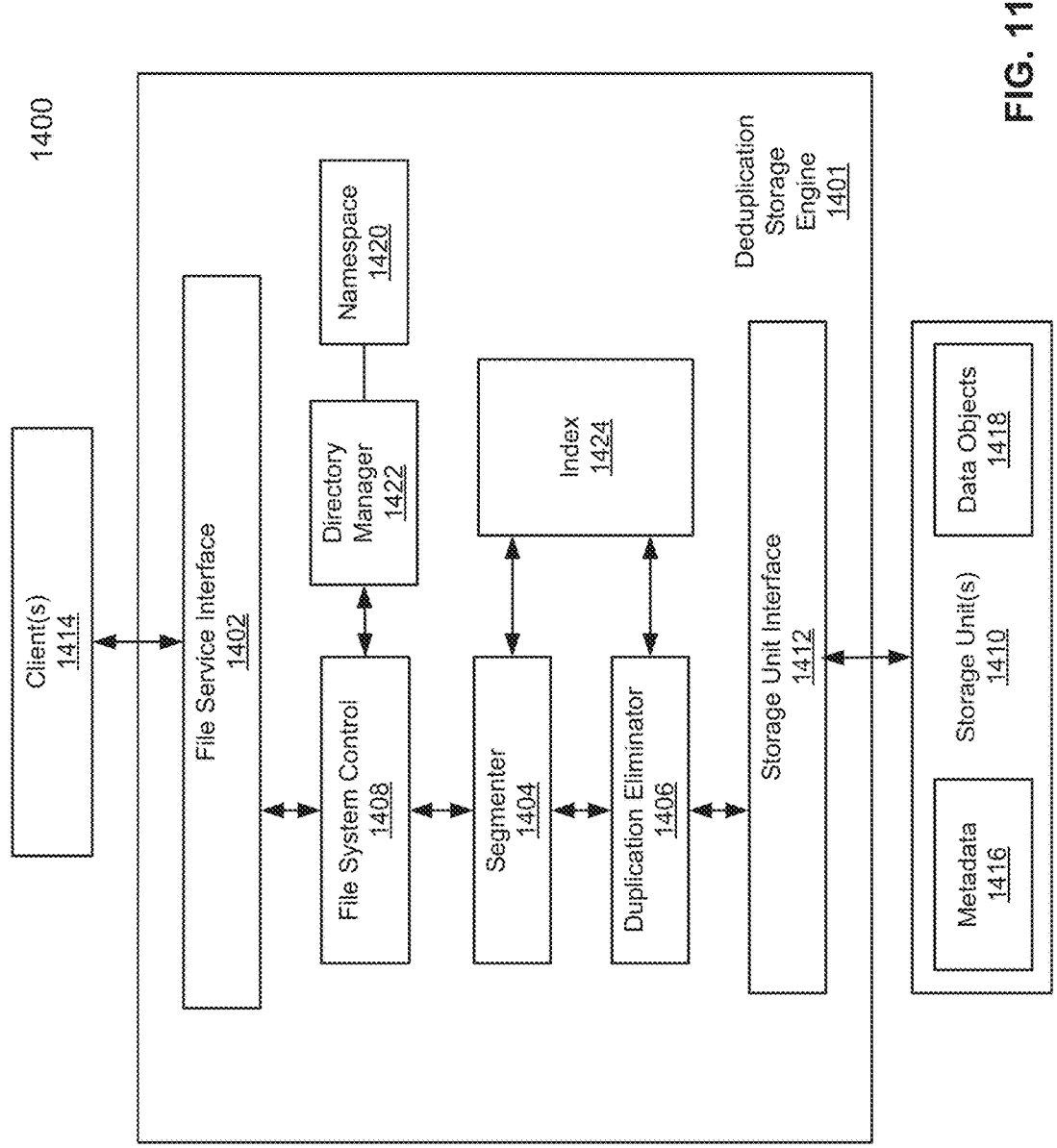
FIG. 11 is a block diagram illustrating a deduplicated storage system according to one embodiment of the invention.

FIG. 11 is a block diagram illustrating a deduplication storage system according to one embodiment of the invention. For example, deduplication storage system 1400 may be implemented as part of a deduplication storage system as described above, such as, for example, the deduplication storage system as a client and/or a server as shown in FIG. 1. In one embodiment, storage system 1400 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 1400 may have a distributed architecture, or all of its components may be integrated into a single unit. Storage system 1400 may be implemented as part of an archive and/or backup system such as a deduplicating storage system available from EMC® Corporation of Hopkinton, Mass.

In one embodiment, storage system 1400 includes a deduplication engine 1401 interfacing one or more clients 1414 with one or more storage units 1410 storing metadata 1416 and data objects 1418. Clients 1414 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 1410 may be implemented locally (e.g., single node operating environment) or remotely (e.g., multi-node operating environment) via an interconnect, which may be a bus and/or a network (e.g., a storage network). In one embodiment, one of storage units 1410 operates as an active storage to receive and store external or fresh user data from a client (e.g., an end-user client or a primary storage system associated with one or more end-user clients), while the another one of storage units 1410 operates as a target storage unit to periodically archive data from the active storage unit according to an archiving policy or scheme. Storage units 1410 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1410 may also be combinations of such devices. In the case of disk storage media, the storage units 1410 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 1416, may be stored in at least some of storage units 1410, such that files can be accessed independent of another storage unit. Metadata of each storage unit includes enough information to provide access to the files it contains. In one embodiment, metadata may include fingerprints contained within data objects 1418, where a data object may represent a data chunk, a compression region (CR) of one or more data chunks, or a container of one or more CRs. Fingerprints are mapped to a particular data object via metadata 1416, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 1416 may include a file name, a storage unit identifier (ID) identifying a storage unit in which the chunks associated with the file name are stored, reconstruction information for the file using the chunks, and any other appropriate metadata information. Metadata 1416 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk (also referred to as a data segment), one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 1401 includes file service interface 1402, segmenter 1404 (also referred to as a chunking module or unit), duplicate eliminator 1406, file system control 1408, and storage unit interface 1412. Deduplication storage engine 1401 receives a file or files (or data item(s)) via file service interface 1402, which may be part of a file system namespace 1420 of a file system associated with the deduplication storage engine 1401. The file system namespace 1420 refers to the way files are identified and organized in the system. An example is to organize the files hierarchically into directories or folders, which may be managed by directory manager 1422. File service interface 1412 supports a variety of protocols, including a network file system (NFS), a common Internet file system (CIFS), and a virtual tape library interface (VTL), etc.

The file(s) is/are processed by segmenter 1404 and file system control 1408. Segmenter 1404, also referred to as a content store, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based, such as, for example, a hash function is applied to values of data within a sliding window through the data stream or block and when the hash function is equal to a value (or equal to one of several values) then a chunk boundary is identified. In various embodiments, chunk boundaries are identified using content based functions operating on a sliding window within a data stream or block that have a minimum or maximum or other value or any appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, a chunk boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 1408, also referred to as a file system manager, processes information to indicate the chunk(s) association with a file. In some embodiments, a list of fingerprints is used to indicate chunk(s) associated with a file. File system control 1408 passes chunk association information (e.g., representative data such as a fingerprint) to index 1424. Index 1424 is used to locate stored chunks in storage units 1410 via storage unit interface 1412. Duplicate eliminator 1406, also referred to as a segment store, identifies whether a newly received chunk has already been stored in storage units 1410. In the event that a chunk has already been stored in storage unit(s), a reference to the previously stored chunk is stored, for example, in a chunk or segment tree associated with the file, instead of storing the newly received chunk. A chunk or segment tree of a file may include one or more nodes and each node represents or references one of the deduplicated chunks stored in storage units 1410 that make up the file. Chunks are then packed by a container manager (which may be implemented as part of storage unit interface 1412) into one or more storage containers stored in storage units 1410. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to as deduplicated segments). A container may further contain the metadata such as fingerprints, sketches, type of the data chunks, etc. that are associated with the data chunks stored therein.

When a file is to be retrieved, file service interface 1402 is configured to communicate with file system control 1408 to identify appropriate chunks stored in storage units 1410 via storage unit interface 1412. Storage unit interface 1412 may be implemented as part of a container manager. File system control 1408 communicates (e.g., via segmenter 1404) with index 1424 to locate appropriate chunks stored in storage units via storage unit interface 1412. Appropriate chunks are retrieved from the associated containers via the container manager and are used to construct the requested file. The file is provided via interface 1402 in response to the request. In one embodiment, file system control 1408 utilizes a tree (e.g., a chunk tree obtained from namespace 1420) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1401 may be implemented in software (e.g., executable code executed in a memory by a processor), hardware (e.g., processor(s)), or a combination thereof. For example, deduplication engine 1401 may be implemented in a form of executable instructions that can be stored in a machine-readable storage medium, where the instructions can be executed in a memory by a processor.

In one embodiment, storage system 1400 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Figure 12:
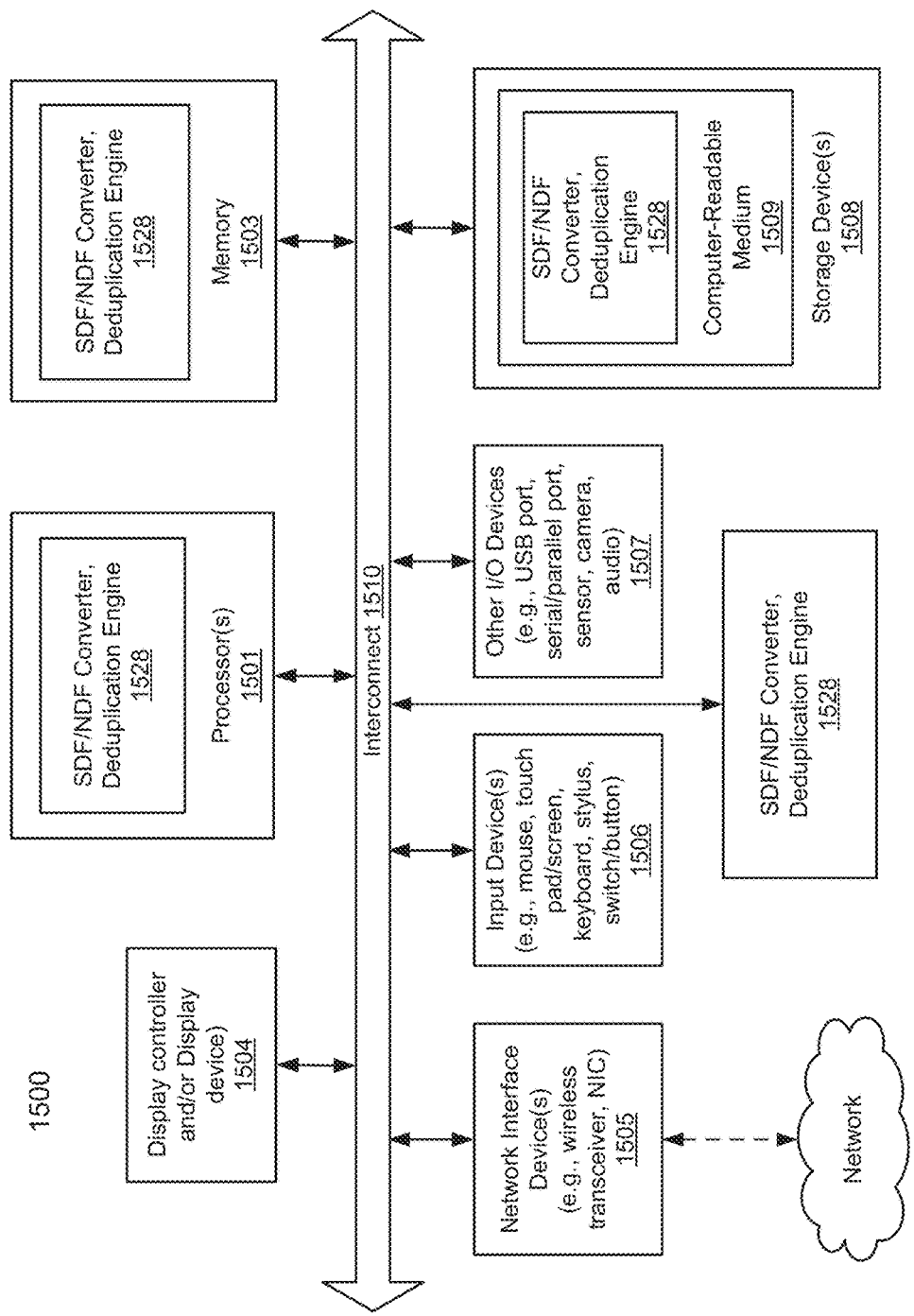
FIG. 12 is a block diagram illustrating a data processing system according to one embodiment.

FIG. 12 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra low voltage processor, may act as a main processing unit and central hub for communication with the various components of the system. Such processor can be implemented as a system on chip (SoC). Processor 1501 is configured to execute instructions for performing the operations and steps discussed herein. System 1500 further includes a graphics interface that communicates with graphics subsystem 1504, which may include a display controller, a graphics processor, and/or a display device.

Processor 1501 may communicate with memory 1503, which in an embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, input device(s) 1506, and other IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein.

Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for restoring backup data, the method comprising:
   receiving, by a restore module loaded in a memory and executed by a processor of a storage system, a request from a client device over a network for restoring a data stream stored in the storage system;
   in response to the request, identifying by the restore module a sparse disk file stored in the storage system, the sparse disk file representing the requested data stream, wherein the sparse disk file includes a plurality of payload blocks sparsely located and intertwined with metadata of the sparse disk file, wherein the sparse disk file includes a block allocation table (BAT) having a plurality of block entries, each block entry corresponding to one of a plurality of data blocks within the payload blocks of the sparse disk file;
   converting, by a converter executed in the memory by the processor of the storage system, the sparse disk file into a native disk file based on the payload blocks of the sparse disk file, wherein creating the native disk file includes locating, within the sparse disk file, a payload block corresponding to each of the plurality of block entries based on an offset of the block entry, and performing a fast-copy and rebase operation from the corresponding payload block to a new data block in the native disk file, wherein the native disk file has a size equal to a disk size specified by the sparse disk file; and
   providing a block-based accessing interface to the client to allow the client accessing the native disk file, wherein each block of content represented by the native disk file is accessed based on a block identifier and an offset indicating a location of the block within the native disk file.

2. The method of claim 1, wherein the sparse disk file is a virtual hard disk (VHD) compatible file.

3. The method of claim 1, wherein the block-based accessing interface is one of a small computer system interface (SCSI) and Fibre channel interface.

4. The method of claim 1, wherein converting the sparse disk file into a native disk file comprises:
- parsing the sparse disk file to identify the block allocation table within the sparse disk file; and
- for each of the block entries of the block allocation table, retrieving an offset from the block entry,
  - accessing a corresponding data block from the payload blocks of the sparse disk file based on the retrieved offset, and
  - determining a pointer of the corresponding data block, wherein the pointer of the data block is used to represent the data block without having to physically copy content of the data block.

5. The method of claim 4, further comprising:
- prior to parsing the sparse disk file, creating the native disk file as a place holder; and
- for each of the block entries of the block allocation table of the sparse disk file, writing the pointer of the corresponding data block in a disk and volume content segment of the native disk file.

6. The method of claim 5, further comprising writing a master boot record and a partition table of the native disk file based on the disk and volume content segment.

7. The method of claim 5, wherein a pointer of a data block links to one of a plurality of payload blocks of the sparse disk file, without physically copying a corresponding payload block.

8. A non-transitory machine-readable medium having instructions stored therein, which when executed by a processor, cause the processor to perform operations for restoring backup data, the operations comprising:
- receiving, by a restore module loaded into a memory and executed by a processor of a storage system, a request from a client device over a network for restoring a data stream stored in the storage system;
- in response to the request, identifying by the restore module a sparse disk file stored in the storage system, the sparse disk file representing the requested data stream, wherein the sparse disk file includes a plurality of payload blocks sparsely located and intertwined with metadata of the sparse disk file, wherein the sparse disk file includes a block allocation table (BAT) having a plurality of block entries, each block entry corresponding to one of a plurality of data blocks within the payload blocks of the sparse disk file;
- converting, by a converter executed in the memory by the processor of the storage system, the sparse disk file into a native disk file based on the payload blocks of the sparse disk file, wherein creating the native disk file includes locating, within the sparse disk file, a payload block corresponding to each of the plurality of block entries based on an offset of the block entry, and performing a fast-copy and rebase operation from the corresponding payload block to a new data block in the native disk file, wherein the native disk file has a size equal to a disk size specified by the sparse disk file; and
- providing a block-based accessing interface to the client to allow the client accessing the native disk file, wherein each block of content represented by the native disk file is accessed based on a block identifier and an offset indicating a location of the block within the native disk file.

9. The non-transitory machine-readable medium of claim 8, wherein the sparse disk file is a virtual hard disk (VHD) compatible file.

10. The non-transitory machine-readable medium of claim 8, wherein the block-based accessing interface is one of a small computer system interface (SCSI) and Fibre channel interface.

11. The non-transitory machine-readable medium of claim 8, wherein converting the sparse disk file into a native disk file comprises:
- parsing the sparse disk file to identify the block allocation table within the sparse disk file; and
- for each of the block entries of the block allocation table, retrieving an offset from the block entry,
  - accessing a corresponding data block from the payload blocks of the sparse disk file based on the retrieved offset, and
  - determining a pointer of the corresponding data block, wherein the pointer of the data block is used to represent the data block without having to physically copy content of the data block.

12. The non-transitory machine-readable medium of claim 11, wherein the operations further comprise:
- prior to parsing the sparse disk file, creating the native disk file as a place holder; and
- for each of the block entries of the block allocation table of the sparse disk file, writing the pointer of the corresponding data block in a disk and volume content segment of the native disk file.

13. The non-transitory machine-readable medium of claim 12, wherein the operations further comprise writing a master boot record and a partition table of the native disk file based on the disk and volume content segment.

14. The non-transitory machine-readable medium of claim 12, wherein a pointer of a data block links to one of a plurality of payload blocks of the sparse disk file, without physically copying a corresponding payload block.

15. A storage system, comprising:
- a processor;
- a memory;
- a restore module executed in the memory by the processor to receive a request from a client device over a network for restoring a data stream stored in the storage system, and in response to the request, to identify a sparse disk file stored in the storage system, the sparse disk file representing the requested data stream, wherein the sparse disk file includes a plurality of payload blocks sparsely located and intertwined with metadata of the sparse disk file, wherein the sparse disk file includes a block allocation table (BAT) having a plurality of block entries, each block entry corresponding to one of a plurality of data blocks within the payload blocks of the sparse disk file;
- a converter executed in the memory by the processor to convert the sparse disk file into a native disk file based on the payload blocks of the sparse disk file, wherein creating the native disk file includes locating, within the sparse disk file, a payload block corresponding to each of the plurality of block entries based on an offset of the block entry, and performing a fast-cop and rebase operation from the corresponding payload block to a new data block in the native disk file, wherein the native disk file has a size equal to a disk size specified by the sparse disk file; and a block-based accessing interface to allow a client accessing the native disk file, wherein each block of content represented by the native disk file is accessed based on a block identifier and an offset indicating a location of the block within the native disk file.

16. The system of claim 15, wherein the sparse disk file is a virtual hard disk (VHD) compatible file.

17. The system of claim 15, wherein the block-based accessing interface is one of a small computer system interface (SCSI) and Fibre channel interface.

18. The system of claim 15, wherein the converter is adapted to parse the sparse disk file to identify the block allocation table within the sparse disk file, and for each of the block entries of the block allocation table, retrieve an offset from the block entry, access a corresponding data block from the payload blocks of the sparse disk file based on the retrieved offset, and determine a pointer of the corresponding data block, wherein the pointer of the data block is used to represent the data block without having to physically copy content of the data block.

19. The system of claim 18, wherein the converter is adapted to prior to parsing the sparse disk file, create the native disk file as a place holder, and for each of the block entries of the block allocation table of the sparse disk file, write the pointer of the corresponding data block in a disk and volume content segment of the native disk file.

20. The system of claim 19, wherein the converter is further to write a master boot record and a partition table of the native disk file based on the disk and volume content segment.

21. The system of claim 19, wherein a pointer of a data block links to one of a plurality of payload blocks of the sparse disk file, without physically copying a corresponding payload block.

* * * * *